UNITED STATES PATENT OFFICE.

WILHELM BERCHELMANN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

WOOL DYE.

958,850. Specification of Letters Patent. Patented May 24, 1910.

No Drawing. Application filed January 18, 1910. Serial No. 538,773.

*To all whom it may concern:*

Be it known that I, WILHELM BERCHELMANN, doctor of philosophy, chemist, citizen of the German Empire, residing at Vohwinkel, near Elberfeld, Germany, have invented new and useful Improvements in Dyes, of which the following is a specification.

My invention relates to the manufacture and production of new compounds of the anthracene series. The process for their production consists in treating alpha-aminoanthraquinones with epichlorhydrin:

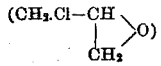

By treating the new compounds thus produced with sulfonating agents soluble new dyestuffs are obtained.

It is not necessary to introduce sulfonic groups into the products obtained by the action of epichlorhydrin if the starting materials contain already sulfonic groups.

The new dyes are after being dried and pulverized in the shape of their alkaline salts dark powders which are soluble in water generally with from a red to blue color and which are soluble in concentrated sulfuric acid generally with from a red to violet-red color. They dye wool generally from red to blue to violet shades.

In order to illustrate the new process more fully the following example is given, the parts being by weight:—A mixture of 150 parts of 1.4-diaminoanthraquinone, 1500 parts of glacial acetic acid and 375 parts of epichlorhydrin is heated for several days to 30–35° C. until it has assumed a blue coloration. The new product thus obtained is filtered off and dried. 10 parts of it are then introduced into 100 parts of fuming sulfuric acid (5% $SO_3$) and the mixture is stirred at 15–20° C. until a sample is completely soluble in water. It is then poured into 600 parts of ice-water, the dye is salted out with common salt and dried. It is a dark powder which is soluble in water with pure blue color and which is soluble in concentrated sulfuric acid with a violet-red color. It dyes wool pure blue shades fast to light.

The process is carried out in an analogous manner as described in the example on starting from other alpha-aminoanthraquinones, *e. g.* 1.5-diaminoanthraquinone (red dye), 1-aminoanthraquinone (yellowish-red dye), 1.4.5.8-tetraaminoanthraquinone (greenish-blue dye), 1.4-aminooxyanthraquinone (violet dye), para-diaminoanthrarufin disulfonic acid (blue dye, produced by treatment with epichlorhydrin without further sulfonation). Other sulfonating agents, *e. g.* chlorosulfonic acid etc. may be used.

I claim:

1. The herein-described new dyestuffs obtainable from 1-aminoanthraquinones and epichlorhydrin which are after being dried and pulverized in the shape of their alkaline salts dark powders soluble in water generally with from a red to blue color, soluble in concentrated sulfuric acid generally with from a red to violet-red color; and dyeing wool generally from red to blue to violet shades, substantially as described.

2. The herein-described new dyestuff obtainable from 1.4-diaminoanthraquinone and epichlorhydrin, which dye is after being dried and pulverized in the shape of its sodium salt a dark powder soluble in water with a pure blue color and soluble in concentrated sulfuric acid with a violet-red color; dyeing wool pure blue shades fast to light, substantially as described.

In testimony whereof I have hereunto set my hand in the presence of two subscribing witnesses.

WILHELM BERCHELMANN. [L. S.]

Witnesses:
OTTO KÖNIG,
CHAS. J. WRIGHT.